(12) United States Patent
Chen (10) Patent No.: US 12,182,597 B2
(45) Date of Patent: Dec. 31, 2024

(54) HYBRID PARTITIONING OF VIRTUALIZATION ON MULTIPLE CORE SYSTEMS

(71) Applicant: VMware LLC, Palo Alto, CA (US)

(72) Inventor: Tiejun Chen, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 16/483,517

(22) PCT Filed: Jul. 2, 2019

(86) PCT No.: PCT/CN2019/094369
§ 371 (c)(1),
(2) Date: Aug. 5, 2019

(65) Prior Publication Data
US 2023/0195481 A1    Jun. 22, 2023

(51) Int. Cl.
*G06F 9/455* (2018.01)

(52) U.S. Cl.
CPC ...... *G06F 9/45558* (2013.01); *G06F 9/45541* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 8,893,267 B1 * | 11/2014 | Sathe | ................... | G06F 21/554 711/163 |
| 11,416,587 B1 * | 8/2022 | den Hartog | ............. | G06F 21/53 |
| 2010/0229168 A1 * | 9/2010 | Maeda | ................... | G06F 9/4856 718/1 |
| 2011/0067105 A1 * | 3/2011 | Wolfe | ..................... | G06F 21/53 718/1 |
| 2012/0174097 A1 * | 7/2012 | Levin | .................... | G06F 9/5077 718/1 |
| 2013/0198758 A1 * | 8/2013 | Lim | ...................... | G06F 9/5061 718/104 |
| 2013/0339976 A1 * | 12/2013 | Mueller | .................... | G06F 9/50 718/104 |
| 2015/0355931 A1 * | 12/2015 | Cropper | ............. | G06F 9/45558 718/1 |
| 2016/0147550 A1 * | 5/2016 | McWilliams | ....... | G06F 9/45558 718/1 |
| 2017/0005990 A1 * | 1/2017 | Birger | ................... | H04L 9/0819 |
| 2017/0153918 A1 * | 6/2017 | Guo | ...................... | G06F 9/5027 |
| 2019/0004846 A1 * | 1/2019 | Li | ......................... | G06F 9/5077 |

\* cited by examiner

*Primary Examiner* — Wynuel S Aquino
(74) *Attorney, Agent, or Firm* — King Intellectual Asset Management (57) ABSTRACT

Disclosed are various approaches for the partitioning of virtualization on systems with multiple core processors. In one approach, hardware extensions for virtualizations are enabled on one or more first cores of a plurality of cores of the processor. The hardware extensions for virtualization are disabled on one or more second cores of the plurality of cores. A virtual machine instance is executed on the first cores having the hardware extensions for virtualization enabled. A real-time operating system is executed on the second cores having the hardware extensions for virtualization disabled.

20 Claims, 6 Drawing Sheets

HYBRID PARTITIONING OF VIRTUALIZATION ON MULTIPLE CORE SYSTEMS

CROSS-REFERENCE TO RELATED APPLICATION

This application is the 35 U.S.C. § 371 national stage application of PCT Application No. PCT/CN2019/094369, filed Jul. 2, 2019 which is incorporated herein by reference in its entirety.

BACKGROUND

Hardware virtualization offers many benefits in computing, including reduced costs, strong isolation, improved security, and other benefits. For example, virtualization enables multi-tenancy, where multiple customers can execute their own separate virtual machines on a single physical host. In some cases, many small servers or embedded systems such as Internet of Things (IoT) edge gateways can be consolidated using separate virtual machines on a single physical host. Virtual machines can be easily moved from one physical host to another as necessary. Also, virtual machines can be more easily administered remotely than a physical host.

Though there are many benefits to virtualization, there can also be some disadvantages. Particularly, the addition of a hypervisor and context switching among different virtual machines can impose performance penalties. To improve performance, processor manufacturers have created processor extensions that enable hardware-assisted virtualization. Commercially available examples of processor extensions include VT-X from INTEL and AMD-V from AMD. Also, many current processors are developed with a multiple core architecture, having two or more processing cores that can execute different processes or threads concurrently. With multiple cores, the need to perform context switches among different virtual machines is reduced, thereby improving performance.

Yet, even with multiple core processors and hardware-assisted virtualization, the performance impact of virtualization is still significant for certain real-time systems. Real-time systems have very high performance requirements and can include telecommunications systems, avionic systems, industrial automation systems, medical systems, automotive systems, and other systems. The context switches between different virtual machines and/or the hypervisor always causes a performance overhead. Even with improvements to schedulers, it is very difficult to meet real-time requirements for essential, safety-critical systems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for the hybrid partitioning of virtualization on multiple core systems to improve real-time performance. It is difficult for virtualized systems to meet the performance requirements of certain real-time applications. The availability of multiple cores can provide performance improvements over single core systems, as the frequency and associated performance penalties of context switching can be reduced. Likewise, hardware-assisted virtualization can provide performance improvements over systems with no virtualization extensions or where the virtualization extensions are disabled. Further, hypervisor schedulers can be customized to prefer real-time processes. Despite these improvements, virtualized system performance can be insufficient for certain real-time applications. These real-time applications are typically executed on non-virtualized native systems in order to meet the performance requirements.

Examples of the present disclosure present approaches to partition cores in a multiple core computing device into a virtualized domain and a non-virtualized native domain. As a non-limiting example, for an eight-core processor, six cores can be configured for the virtualized domain, while the remaining two cores can be configured for the native domain. Virtualization extensions in the processor can be disabled for the cores in the native domain and enabled for the cores in the virtualized domain. Accordingly, a hypervisor and virtual machines can execute in the virtualized domain, while a native image can be executed in the native domain. Shared memory between the virtualized domain and the native domain can facilitate communication between the two domains. Through this approach, a real-time application can execute in a real-time operating system directly on a native core, thereby allowing the real-time application to meet its performance design requirements.

Figure 1:
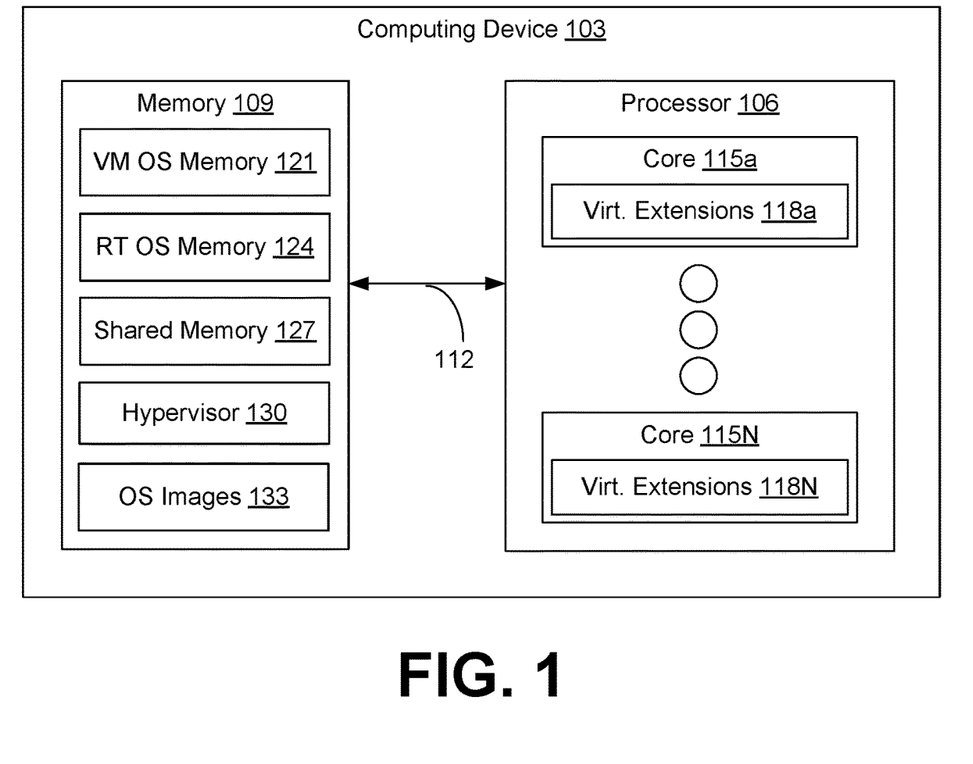
FIG. 1 is a block diagram corresponding to a computing device according to various examples of the disclosure.

With reference to FIG. 1, shown is a block diagram corresponding to a computing device 103. The computing device 103 corresponds to a physical server computer, a physical client computer, or another physical computer. The computing device 103 includes at least one processor circuit, with a processor 106 and a memory 109, which are coupled to a local interface 112. Although one processor 106 is shown in FIG. 1, the computing device 103 can include multiple processors 106. Such multiple processors 106 can include multiple central processing units (CPUs) and/or other processors 106 such as graphics processing units (CPUs), field programmable logic arrays (FPGAs), and others. The local interface 112 can include a data bus with an accompanying address/control bus or another bus structure. The computing device 103 can include other hardware such as network interfaces, display devices, sound devices, and so forth.

The processor 106 includes a plurality of cores 115a . . . 115N, which correspond to replications of hardware units within the processor 106 that enable concurrent processing of multiple instructions across the plurality of cores 115. For example, different threads or processes can be executed concurrently across the plurality of cores 115. Further, different operating systems can be executed concurrently across the plurality of cores 115.

Each of the plurality of cores 115 supports virtualization extensions 118a . . . 118N, corresponding to hardware-assisted virtualization. The virtualization extensions 118 include hardware support for transfer of platform control between guest operating systems and the hypervisor, secure assignment of specific devices to guest operating systems, adapter-based acceleration, and other features that allow for more efficient execution of virtual machine instances. The virtualization extensions 118 can be enabled or disabled on a per-core basis.

The memory 109 can include random access memory (RAM), solid-state storage devices, hard drives, networked storage devices, and/or other data stores and combinations of multiple memories 109. The memory 109 can store both data and instructions that can be executed by the processor 106. The memory 109 can include a virtual machine operating system memory 121, a real-time operating system memory 124, a shared memory 127, a hypervisor 130, operating system images 133, and/or other data.

The virtual machine operating system memory 121 corresponds to a portion of the memory 109 that is accessible to a virtual machine instance, such as a guest operating system, executed on the processor 106. The real-time operating system memory 124 corresponds to a portion of the memory 109 that is accessible to a real-time operating system executed on the processor 106. The real-time operating system memory 124 can be inaccessible to the virtual machine instance, and likewise, the virtual machine operating system memory 121 can be inaccessible to the real-time operating system. A shared memory 127 can be accessible to both the virtual machine instance and the real-time operating system, thereby allowing communication between the virtual machine instance and the real-time operating system. Such communication can be facilitated through an application programming interface (API) of the hypervisor 130.

The hypervisor 130, or virtual machine monitor, is executed on the processor 106 to launch, execute, and terminate virtual machine instances. In addition, the hypervisor 130 is executed to partition the cores 115 between a virtualized domain and a native domain. In this regard, the hypervisor 130 can launch real-time operating systems for execution in the native domain on one or more of the cores 115 that have been configured for native, non-virtualized operation. The hypervisor 130 can include a hypervisor scheduler for scheduling virtual machine processes for execution on cores 115 in the virtualized domain.

The operating system images 133 includes images of operating systems, which can include guest operating systems that are executed as virtual machine instances, and real-time operating systems that are executed in the native domain. The operating system images 133 can include an operating system, an operating system scheduler, working memory, applications, application data, services, service data, and/or other data.

Figure 2:
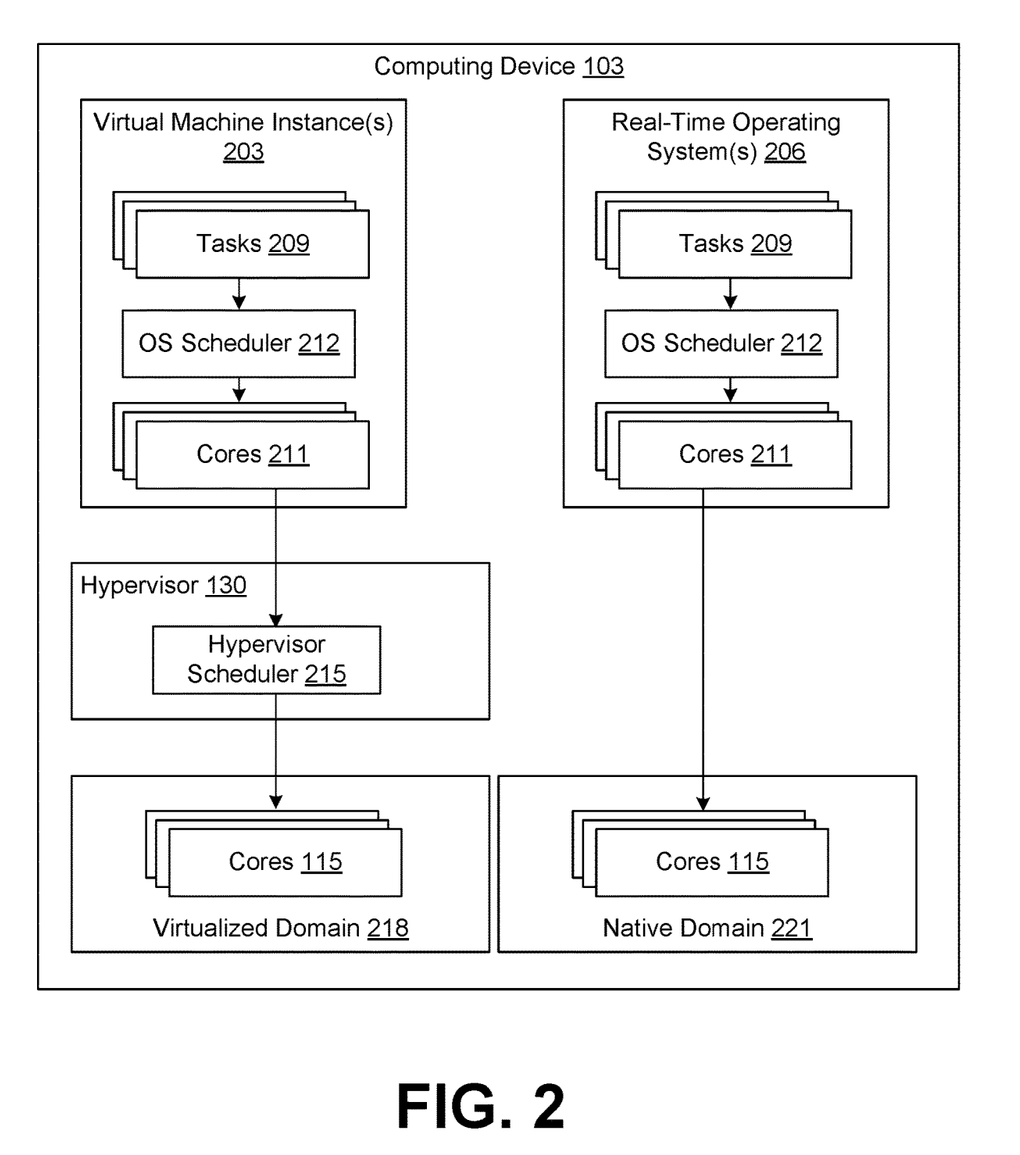
FIG. 2 is a block diagram illustrating the operation of logical components of the computing device of FIG. 1 according to various examples of the disclosure.

Moving on to FIG. 2, shown is a block diagram illustrating the operation of logical components of the computing device 103 (FIG. 1). The computing device 103 executes concurrently one or more virtual machine instances 203 and one or more real-time operating systems 206. The virtual machine instances 203 can correspond to operating systems such as MICROSOFT WINDOWS, IOS, ANDROID, LINUX, and so on, which can include real-time operating systems that have a performance requirement that can be met using virtualization.

A real-time operating system 206 is designed to execute real-time applications that process data as it is received with minimal buffer delays. The real-time operating system 206 can be associated with a performance requirement that cannot be met using virtualization, and thus will be executed natively on dedicated processor cores. The performance requirement can be user-specified or otherwise associated with an application or service that is executed within the real-time operating system 206. The performance requirement can be specified in tenths of seconds or in shorter time increments. Whether the performance requirement can be met through virtualization or native execution can depend on the resources available in the computing device 103 and whether those resources have been dedicated to or are otherwise being used by other machine instances executing on the computing device 103.

The virtual machine instances 203 and the real-time operating system 206 each are running multiple tasks 209, which can correspond to threads, processes, or other tasks. These tasks 209 are scheduled for execution on processor cores 211 by a respective operating system scheduler 212.

In the case of the virtual machine instance 203, the hypervisor 130 intercedes and the hypervisor scheduler 215 schedules the tasks 209 assigned to virtualized cores 211 for execution on a subset of the cores 115 in the virtualized domain 218. The subset of the cores 115 in the virtualized domain 218 are cores 115 for which the virtualization extensions 118 have been enabled. It is noted that the quantity of virtualized cores 211 can differ from the quantity of cores 115 in the subset of the cores 115 in the virtualized domain 218.

In the case of the real-time operating system 206, the cores 211 can map directly to a subset of the cores 115 in the native domain 221. As such, the real-time operating system 206 avoids the overhead of the hypervisor scheduler 215 because the tasks 209 that are scheduled by the operating system scheduler 212 for execution on the cores 211 are executed on the cores 115 that map to the cores 211. The hypervisor 130 can configure the real-time operating system 206 to utilize particular cores 115 of the cores in the native domain 221, such that the real-time operating system 206 cannot access other cores 115 in the native domain 221 or the cores 115 in the virtualized domain 218. The native domain 221 can be further subdivided into multiple subdomains including one or more of the cores 115 such that respective real-time operating systems 206 are executed on corresponding subdomains of the native domain 221.

Figure 3:
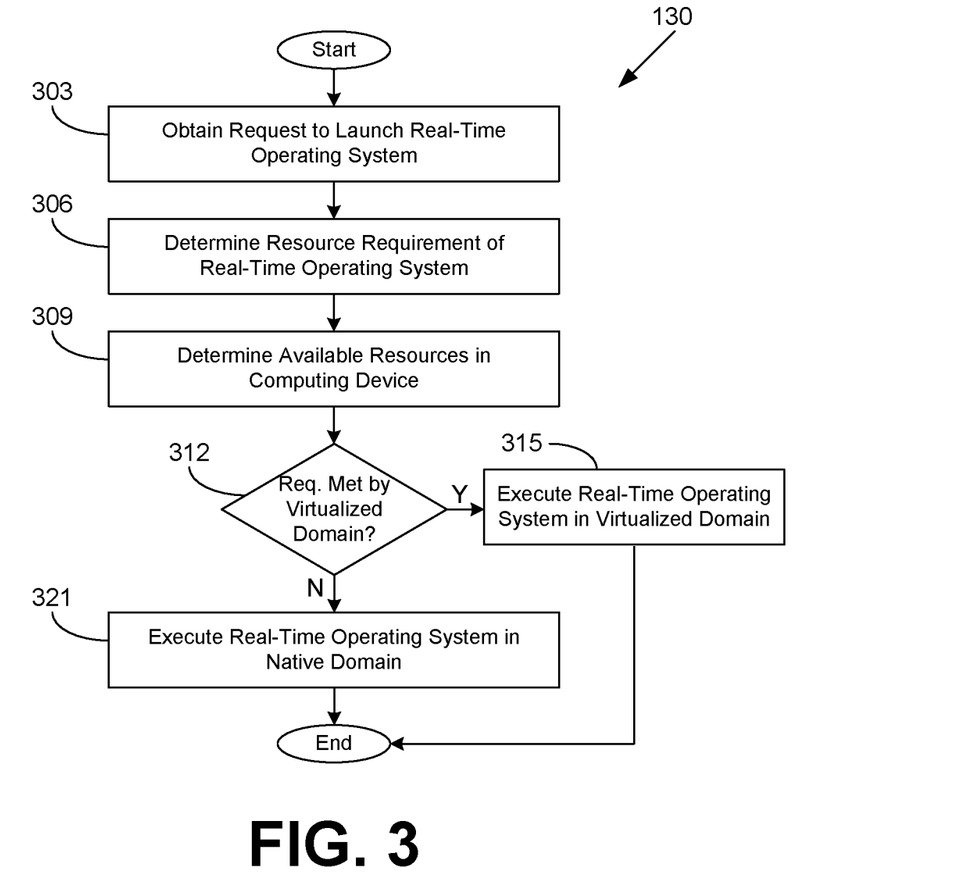
FIGS. 3-6 are flowcharts illustrating examples of functionality implemented in a hypervisor according to various examples of the present disclosure.

Referring next to FIG. 3, shown is a flowchart that provides one example of the operation of the hypervisor 130. Functionality attributed to the hypervisor 130 can be implemented in a single process or application or in multiple processes or applications. The separation or segmentation of functionality as discussed herein is presented for illustrative purposes only.

Beginning with step 303, the hypervisor 130 obtains a request to launch a real-time operating system 206. For example, the request can originate from a user through a user interface, or the request can be generated by an auto-scaler. At step 306, the hypervisor 130 determines a resource requirement of the real-time operating system 206. A real-time application or service to be executed on the real-time operating system 206 can have a performance requirement specified, for example, as a minimum responsiveness in a fraction of a second or other time interval. The performance requirement can be user configured or determined empirically by observing a performance threshold below which errors begin to occur or responsiveness issues are reported.

At step 309, the hypervisor 130 determines available resources in the computing device 103. To this end, the hypervisor 130 can determine the available memory 109 and capacity in the processor 106 with respect to existing allocations of virtual machine instances 203 or real-time operating systems 206.

At step 312, the hypervisor 130 determines whether the resource requirement associated with the real-time operating system 206 can be met through execution in the virtualized domain 218. In other words, the hypervisor 130 determines whether execution through the hypervisor scheduler 215 on cores 115 in the virtualized domain 218 will meet the performance requirement given the available resources determined at step 306.

If so, at step 315 the hypervisor 130 proceeds to execute the real-time operating system 206 in the virtualized domain 218. In this regard, the hypervisor 130 can load an operating system image 133 corresponding to the real-time operating system 206 from the memory 109 and begin execution of the real-time operating system 206 such that tasks 209 generated by the real-time operating system 206 are assigned by the operating system scheduler 212 to virtual cores 211, and the hypervisor scheduler 215 assigns the tasks 209 from the virtual cores 211 to the physical cores 115 in the virtualized domain 218, where the virtualization extensions 118 have been enabled.

If, instead, the resource requirement cannot be met through execution in the virtualized domain 218, the hypervisor 130 continues from step 312 to step 321 and executes the real-time operating system 206 in the native domain 221. In this regard, the hypervisor 130 can load an operating system image 133 corresponding to the real-time operating system 206 from the memory 109 and begin execution of the real-time operating system 206 such that tasks 209 generated by the real-time operating system 206 are assigned by the operating system scheduler 212 to cores 211 that map directly to the physical cores 115 in the native domain 221, where the virtualization extensions 118 have been disabled.

Figure 4:
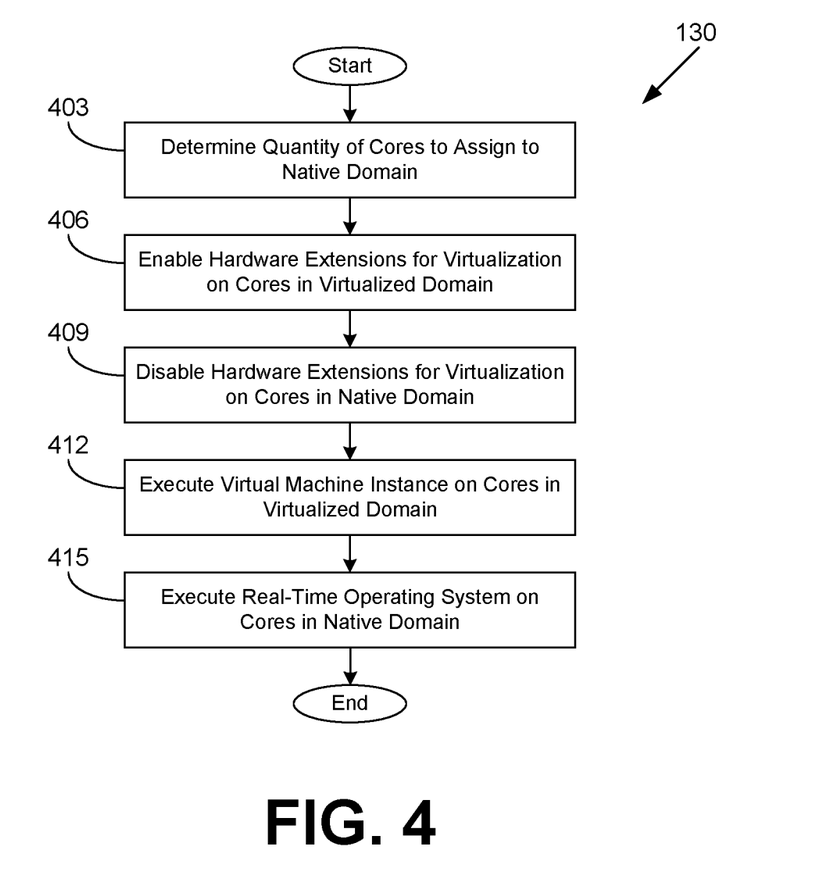

Moving on to FIG. 4, shown is a flowchart that provides another example of the operation of the hypervisor 130. Functionality attributed to the hypervisor 130 can be implemented in a single process or application or in multiple processes or applications. The separation or segmentation of functionality as discussed herein is presented for illustrative purposes only.

Beginning with step 403, the hypervisor 130 determines a quantity of cores 115 to be assigned to the native domain 221 and/or a quantity of cores 115 to be assigned to the virtualized domain 218. For example, the quantity of cores 115 assigned to the native domain 221 can be the minimal number of cores 115 determined to be necessary to meet the resource requirements of one or more real-time operating systems 206 to be instantiated. A minimal quantity in the native domain 221 is used in order to maximize the cores 115 in the virtualized domain 218, which are able to be flexibly assigned to one or more virtual machine instances 203, while the cores 115 in the native domain 221 can be dedicated to particular real-time operating systems 206 while the real-time operating systems 206 are executing.

At step 406, the hypervisor 130 enables the hardware extensions for virtualization on the cores 115 to be assigned to the virtualized domain 218. At step 409, the hypervisor 130 disables the hardware extensions for virtualization on the cores 115 to be assigned to the native domain 221. For any cores 115 which assignment has changed, the hypervisor 130 can ensure that a respective virtual machine instance 203 is not using the cores 115 or that a respective real-time operating system 206 using the cores 115 has been terminated.

At step 412, the hypervisor 130 executes a virtualized machine instance 203 on one or more cores 115 in the virtualized domain 218. At step 415, the hypervisor 130 executes a real-time operating system 206 on one or more cores 115 in the native domain 221. It is noted that multiple real-time operating systems 206 can be executed, but they do not share respective cores 115 in the native domain 221. By contrast, multiple virtual machine instances 203 can share cores 115 in the virtualized domain 218.

Figure 5:
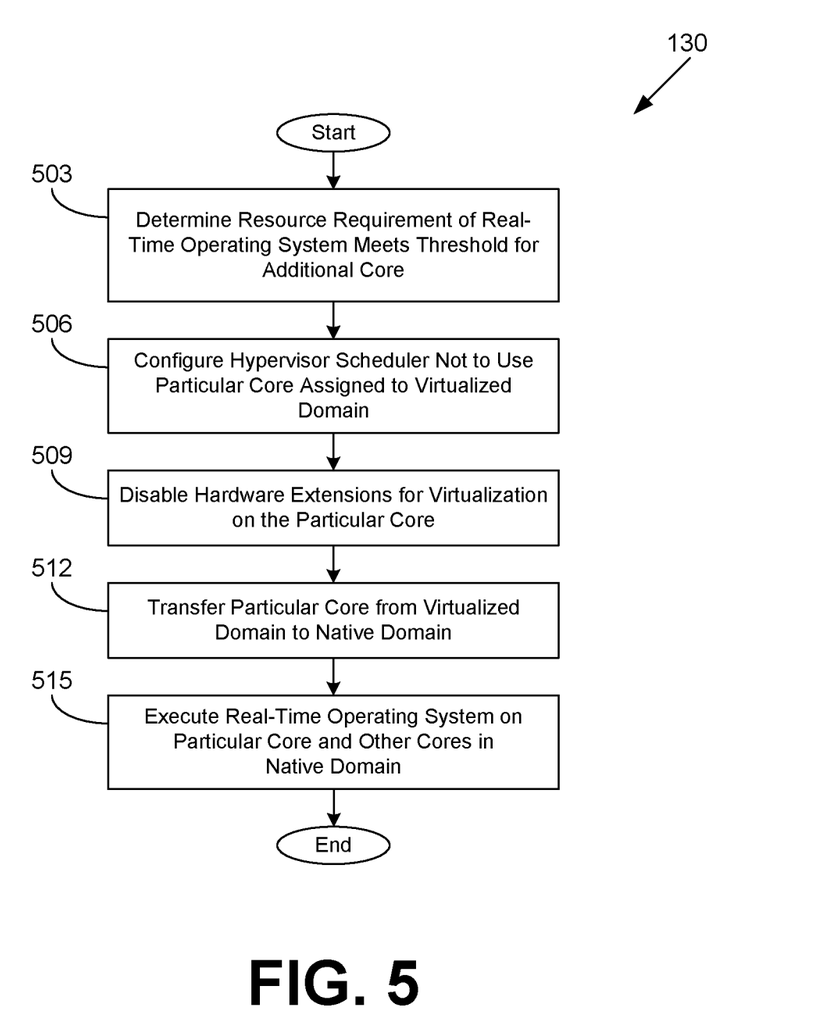

Continuing to FIG. 5, shown is a flowchart that provides another example of the operation of the hypervisor 130. Functionality attributed to the hypervisor 130 can be implemented in a single process or application or in multiple processes or applications. The separation or segmentation of functionality as discussed herein is presented for illustrative purposes only.

Beginning with step 503, the hypervisor 130 determines that a resource requirement of a real-time operating system 206 meets a threshold for requiring an additional core 211. For example, the processing requirements of the real-time operating system 206 can increase over time as the real-time operating system 206 handles larger workloads. At step 506, the hypervisor 130 configures the hypervisor scheduler 215 not to use or schedule workloads on a particular core 115 currently assigned to the virtualized domain 218.

At step 509, the hypervisor 130 disables the hardware extensions for virtualization on the particular core 115. At step 512, the hypervisor 130 transfers the particular core from the virtualized domain 218 to the native domain 221. At step 515, the hypervisor 130 executes the real-time operating system 206 on the particular core 115 and one or more other cores 115 in the native domain 221. To accomplish this reassignment, the hypervisor 130 can stop and restart the real-time operating system 206 so that the real-time operating system 206 can recognize the additional hardware as a core 211 available to it. In other cases, the real-time operating system 206 can dynamically recognize the additional hardware without being stopped and restarted.

Figure 6:
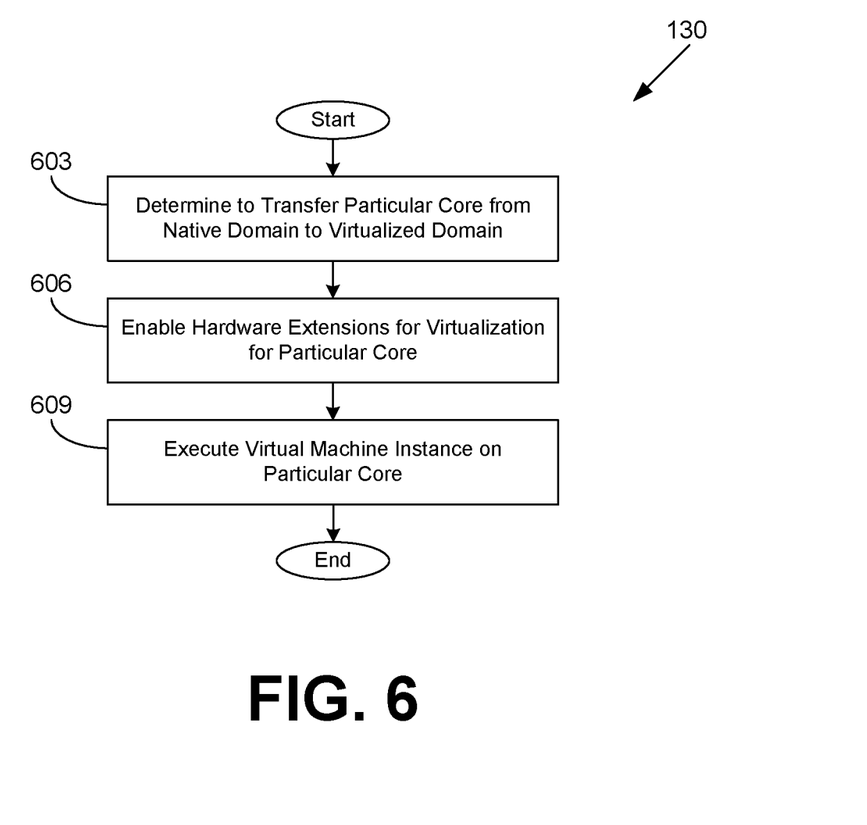

Turning now to FIG. 6, shown is a flowchart that provides another example of the operation of the hypervisor 130. Functionality attributed to the hypervisor 130 can be implemented in a single process or application or in multiple processes or applications. The separation or segmentation of functionality as discussed herein is presented for illustrative purposes only.

Beginning with box 603, the hypervisor 130 determines that a particular core 115 can be transferred from the native domain 221 to the virtualized domain 218. For example, a real-time operating system 206 utilizing the core 115 could be terminated, thereby freeing the core 115. Alternatively, the resource requirements of the real-time operating system 206 can decrease so that the core 115 is no longer necessary in a minimal set of cores 115 to meet the resource requirements.

At step 606, the hypervisor 130 enables hardware extensions for virtualization for the particular core 115 to be transferred from the native domain 221 to the virtualized domain 218. At step 609, the hypervisor 130 executes one or more virtual machine instances 203 on the particular core 115 transferred to the virtualized domain 218. In this regard, the hypervisor schedule 215 can transfer existing tasks 209 from one or more existing virtual machine instances 203 to the newly assigned core 115 in the virtualized domain 218.

The flowcharts of FIGS. 3-6 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The hypervisor 130 and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for virtualization partitioning, comprising:
a computing device comprising a processor and a memory, the processor having a plurality of cores and hardware extensions for virtualization; and
machine readable instructions stored in the memory that, when executed by the processor, cause the computing device to perform operations comprising:
receiving, by a hypervisor, a request to launch one or more real-time operating systems;
assigning, by the hypervisor and based on a determination that performance requirements of the one or more cannot be met through execution in a virtualized domain, a quantity of one or more first cores of the plurality of cores to execute in a native domain;
assigning, by the hypervisor, a quantity of one or more second cores of the plurality of cores to execute in a virtualized domain;
disabling, by the hypervisor, the hardware extensions for virtualizations on the one or more first cores assigned to the native domain;
enabling, by the hypervisor the hardware extensions for virtualization on the one or more second cores assigned to the virtualized domain;
executing, by the hypervisor, one or more virtual machine instances on the one or more second cores having the hardware extensions for virtualization enabled;
executing the one or more real-time operating systems on the one or more first cores assigned to the native domain;
managing, by the hypervisor, the one or more virtual machine on the one or more second cores in the virtualized domain; and
avoiding, by the hypervisor, overhead on the one or more real-time operating systems by configuring the scheduler of the hypervisor not to use the one or more first cores in the virtualized domain.

2. The system of claim 1, wherein the one or more first cores comprise a plurality of first cores, and the one or more second cores comprise a plurality of second cores.

3. The system of claim 1, the operations further comprising:
terminating the one or more real-time operating systems;
configuring, by the hypervisor, the hypervisor scheduler to use the one or more first cores;
enabling, by the hypervisor, the hardware extensions for virtualization on the one or more first cores; and
executing the one or more virtual machine instances on the one or more first cores.

4. The system of claim 1, the operations further comprising:
determining, by the hypervisor, that a resource requirement of the one or more real-time operating systems meets a threshold for requiring an additional core;
a configuring the hypervisor scheduler not to use a particular core of the one or more second cores for the one or more virtual machine instances;
disabling, by the hypervisor, the hardware extensions for virtualization on the particular core of the one or more second cores; and
executing the one or more real-time operating systems on the one or more first cores and the particular core of the one or more second cores.

5. The system of claim 1, the operations further comprising:
determining, by the hypervisor, the quantity of the one or more second cores to assign to the virtualized domain, based at least in part on a resource requirement of the one or more virtual machine instances.

6. The system of claim 1, the operations further comprising:
determining, by the hypervisor, the quantity of the one or more first cores to assign to the native domain, based at least in part on a resource requirement of the one or more real-time operating systems.

7. The system of claim 1, the operations further comprising:
executing the one or more real-time operating systems on the one or more first cores based at least in part on a resource requirement of the one or more real-time operating systems and a resource availability of the one or more first cores.

8. The system of claim 1, wherein the one or more real-time operating systems are a one or more first real-time operating systems, and the operations further comprise:
receiving, by a hypervisor, a request to launch a second real-time operating system;
determining, by the hypervisor, a resource requirement of the second real-time operating system, based at least in part on a performance requirement of an application or service to be executed on the second real-time operating system; and
determining, by the hypervisor, whether the resource requirement of the second real-time operating system can be met through execution on the one or more cores in the virtualized domain.

9. The system of claim 8, the operations further comprising:
based on a determination that the resource requirement of the second real-time operating system can be met through execution on the one or more second assigned to the virtualized domain:
executing the second real-time operating system on the one or more second cores assigned to the virtualized domain; and
assigning, by the hypervisor scheduler, tasks generated by the second real-time operating system to the second one or more cores in the virtualized domain; or
based on a determination that the resource requirement of the second real-time operating system cannot be met through execution on the one or more second cores assigned to the virtualized domain:
executing the second real-time operating system on the one or more first cores assigned to the native domain; and
assigning, by an operating system scheduler of the real-time operating system, tasks generated by the second real-time operating system to the one or more first cores assigned to the native domain.

10. A method for virtualization partitioning, comprising:
receiving, by a hypervisor, a request to launch one or more real-time operating systems;
assigning, by the hypervisor and based on a determination that performance requirements of the one or more cannot be met through execution in a virtualized domain, a quantity of one or more first cores of the plurality of cores to execute in a native domain;
assigning, by the hypervisor, a quantity of one or more second cores of the plurality of cores to execute in a virtualized domain;
disabling, by the hypervisor, the hardware extensions for virtualizations on the one or more first cores assigned to the native domain;
enabling, by the hypervisor the hardware extensions for virtualization on the one or more second cores assigned to the virtualized domain;
executing, by the hypervisor, one or more virtual machine instances on the one or more second cores having the hardware extensions for virtualization enabled;
executing the one or more real-time operating systems on the one or more first cores assigned to the native domain;
managing, by the hypervisor, the one or more virtual machine on the one or more second cores in the virtualized domain; and
avoiding, by the hypervisor, overhead on the one or more real-time operating systems by configuring the scheduler of the hypervisor not to use the one or more first cores in the virtualized domain.

11. The method of claim 10, wherein the one or more first cores comprise a plurality of first cores, and the one or more second cores comprise a plurality of second cores.

12. The method of claim 10, further comprising:
terminating the one or more real-time operating systems;
enabling by, the hypervisor, the hardware extensions for virtualization on the one or more second cores; and
executing the one or more virtual machine instances on the one or more second cores.

13. The method of claim 10, further comprising:
determining, by the hypervisor, that a resource requirement of the one or more real-time operating systems meets a threshold for requiring an additional core;
configuring the hypervisor scheduler not to use a particular core of the one or more second cores for the one or more virtual machine instances;
disabling, by the hypervisor, the hardware extensions for virtualization on the particular core of the one or more second cores; and
executing the one or more real-time operating systems on the one or more first cores and the particular core of the one or more second cores.

14. The method of claim 10, further comprising:
determining, by the hypervisor, the quantity of the one or more first cores for which virtualization is to be enabled based at least in part on a resource requirement of the one or more virtual machine instances.

15. The method of claim 10, further comprising:
determining, by the hypervisor, the quantity of the one or more second cores for which virtualization is to be disabled based at least in part on a resource requirement of the one or more real-time operating systems.

16. The method of claim 10, further comprising:
executing the one or more real-time operating systems on the one or more second cores based at least in part on a resource requirement of the one or more real-time operating systems and a resource availability of the one or more first cores.

17. A non-transitory computer readable medium comprising machine readable instructions that, when executed by a processor of a computing device, cause the computing device to perform operations comprising:
receiving, by a hypervisor, a request to launch one or more real-time operating systems;

assigning, by the hypervisor and based on a determination that performance requirements of the one or more cannot be met through execution in a virtualized domain, a quantity of one or more first cores of the plurality of cores to execute in a native domain;

assigning, by the hypervisor, a quantity of one or more second cores of the plurality of cores to execute in a virtualized domain;

disabling, by the hypervisor, the hardware extensions for virtualizations on the one or more first cores assigned to the native domain;

enabling, by the hypervisor the hardware extensions for virtualization on the one or more second cores assigned to the virtualized domain;

executing, by the hypervisor, one or more virtual machine instances on the one or more second cores having the hardware extensions for virtualization enabled;

executing the one or more real-time operating systems on the one or more first cores assigned to the native domain;

managing, by the hypervisor, the one or more virtual machine on the one or more second cores in the virtualized domain; and avoiding, by the hypervisor, overhead on the one or more real-time operating systems by configuring the scheduler of the hypervisor not to use the one or more first cores in the virtualized domain.

18. The non-transitory computer readable medium of claim 17, wherein the machine readable instructions the operations further comprising:

determining, by the hypervisor, that a resource requirement of the one or more real-time operating systems meets a threshold for requiring an additional core;

configuring the hypervisor scheduler not to use a particular core of the one or more second cores for the one or more virtual machine instances;

disabling, by the hypervisor, the hardware extensions for virtualization on the particular core of the one or more second cores; and executing the one or more real-time operating systems on the one or more first cores and the particular core of the one or more first-second cores.

19. The non-transitory computer readable medium of claim 17, the operations further comprising:

determining, by the hypervisor, the quantity of the one or more second cores to assign to the virtualized domain, based at least in part on a resource requirement of the one or more virtual machine instances; and determining, by the hypervisor, the quantity of the one or more first cores to assign to the native domain, based at least in part on a resource requirement of the one or more real-time operating systems.

20. The non-transitory computer-readable medium of claim 17, the operations further comprising:

executing the one or more real-time operating systems on the one or more second cores based at least in part on a resource requirement of the one or more real-time operating systems and a resource availability of the one or more first cores.

\* \* \* \* \*